United States Patent
Yin et al.

(12)

(10) Patent No.: US 6,693,149 B2
(45) Date of Patent: Feb. 17, 2004

(54) PROCESS FOR PREPARING EPOXY GROUP-CONTAINING CURABLE POLYPHENYLENE ETHER RESIN USING HIGH-MOLECULAR-WEIGHT POLYPHENYLENE RESIN

(75) Inventors: Meng-Song Yin, Hsinchu (TW); Chien-Ting Lin, Hsinchu (TW); Hung-Chou Kang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 45 days.

(21) Appl. No.: 10/133,995

(22) Filed: Apr. 25, 2002

(65) Prior Publication Data

US 2002/0161117 A1 Oct. 31, 2002

(30) Foreign Application Priority Data

Apr. 25, 2001 (TW) ........................ 90109871 A

(51) Int. Cl.[7] ............................... C08G 65/48
(52) U.S. Cl. ................. 525/396; 525/523; 525/905; 549/517; 549/539
(58) Field of Search ................ 525/396, 523, 525/905; 549/517, 539

(56) References Cited

U.S. PATENT DOCUMENTS 4,732,937 A * 3/1988 Sybert ................. 525/92

* cited by examiner

Primary Examiner—Robert Dawson
Assistant Examiner—D. Aylward
(74) Attorney, Agent, or Firm—Darby & Darby

(57) ABSTRACT

A process for preparing an epoxy group-containing curable polyphenylene ether (PPE) resin. The process involves introducing an epoxy group-containing functional group to the terminal end of PPE (Mn>3000) by modifying the hydroxy and ester groups on the terminal end. Thus, a curable PPE resin (Mn>3000) including an epoxy group on the terminal end can be obtained. The modified PPE resin contains epoxy groups and has high glass transition temperature.

14 Claims, 3 Drawing Sheets

PROCESS FOR PREPARING EPOXY GROUP-CONTAINING CURABLE POLYPHENYLENE ETHER RESIN USING HIGH-MOLECULAR-WEIGHT POLYPHENYLENE RESIN

BACKGROUND OF THE INVENTION

1. Field of the Invention

The present invention relates to a process for preparing a curable polyphenylene ether (PPE) resin. More particularly, the present invention relates to a process for preparing a curable polyphenylene ether resin, which involves introducing an epoxy group-containing functional group to the terminal end of PPE (Mn>3000) by modifying the hydroxy and ester groups on the terminal end.

2. Description of the Prior Art

Communication devices tend to function at higher speeds and frequencies. The substrate material for such devices, such as wireless communication networks, satellite communication equipment, high performance and broadband devices, high speed computers and computer work stations, demands a high glass transition temperature (Tg), low dielectric constant (Dk), and low loss factor (Df). Presently, the copper-clad laminate used for printed circuit boards (PCB) is mainly FR-4, the substrate of which is epoxy resin. However, electrical properties (such as Dk and Df) of FR-4 can no longer meet the increasing needs of high frequency.

Polyphenylene ether (PPE), having high Tg and superior electrical properties, is a potential material for high frequency substrates. Therefore, PPE resin has been introduced into the epoxy-made FR-4 substrate, in order to enhance the limited properties of epoxy resin. However, epoxy resin and PPE resin have great difference in chemical structure. Thus, the chemical comparability between these two resins is inferior. When epoxy and PPE resins are mixed, they cannot undergo crosslinking, and phase separation occurs. It is very difficult to use the PPE-Epoxy resin system in printed circuit boards. Therefore, some researchers have attempted to solve the phase separation when PPE and epoxy are mixed.

For example, in U.S. Pat. No. 4,853,423, after PPE and epoxy resins are mixed, zinc acetylacetonate or zinc stearate is added as a compatabilizer. Thus, coordination bonding is generated between PPE and epoxy and no phase separation occurs. However, the addition of these metal salts makes the substrate have inferior electrical properties.

In U.S. Pat. No. 5,834,565, PPE resin is modified to have a smaller molecular weight. The smaller the molecular weight of PPE, the less chance the phase separation between PPE and epoxy. However, when PPE has a too small molecular weight, particularly less than 3000, the PPE-epoxy resin has inferior electrical properties. The addition of PPE is in vain.

In Japanese Patent No. 09291148, PPE resin is redistributed to obtain a PPE resin with Mn of 1000 to 3000. Then, epoxy functional groups are introduced into the redistributed PPE. Although small-molecular-weight PPE resin has better processability, the glass transition temperature is adversely decreased.

Therefore, there is still a need to develop a new process to solve the inferior comparability and phase separation between PPE and epoxy and to obtain an epoxy group-containing PPE with high glass transition temperature.

SUMMARY OF THE INVENTION

An object of the present invention is to solve the above-mentioned problems and to provide a process for preparing an epoxy group-containing curable polyphenylene ether resin with high glass transition temperature.

To achieve the above objects, the process for preparing an epoxy group-containing curable polyphenylene ether (PPE) resin of the present invention includes reacting a polyphenylene ether resin represented by formula (I), a strong base, and a compound containing a leaving group and epoxy group to obtain a curable polyphenylene ether resin represented by formula (II).

Formula (I) has a number average molecular weight higher than 3000 and is

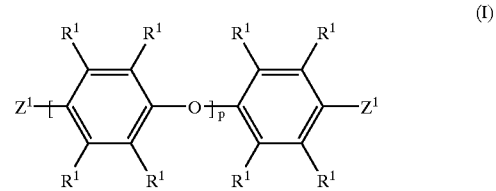

wherein $R^1$ can be the same or different and is H, alkyl having from 1 to 3 carbon atoms, or

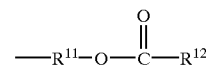

wherein $R^{11}$ is alkylene having from 1 to 3 carbon atoms, and $R^{12}$ is aryl;

$Z^1$ can be the same or different and is H, OH, or

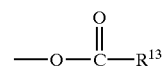

and at least one $Z^1$ is OH or

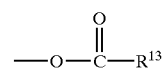

wherein $R^{13}$ is aryl; and p is from 25 to 165.

The compound containing leaving group and epoxy group has the formula (A):

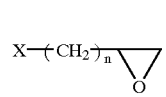

wherein

X is a leaving group of halogen or sulfonate; and n is an integer of 1 to 6.

Formula (II) is:

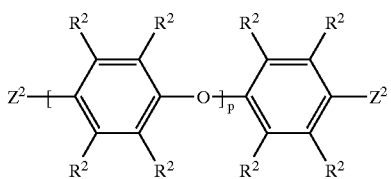

(II)

wherein

R² can be the same or different and is H, alkyl having from 1 to 3 carbon atoms,

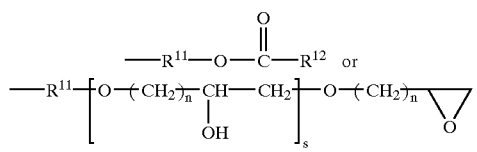

wherein

R¹¹ is alkylene having from 1 to 3 carbon atoms;
R¹² is aryl;
n is an integer of 1 to 6; and
s is 0 or an integer of 1 to 6;

Z² can be the same or different and is H, OH,

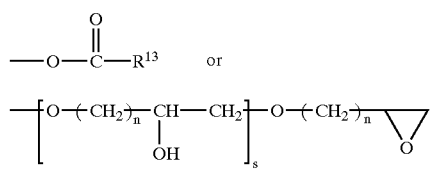

(i)

and at least one is a group represented by formula (i), wherein R¹³ is aryl, n and s are defined above; and p is 25 to 165.

DETAILED DESCRIPTION OF THE INVENTION

Figure 1A:
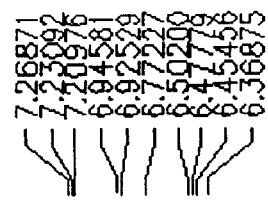
FIG. 1 shows the NMR spectrum of the rPPE product with epoxy group on terminal end, prepared from Example 2 of the present invention.

The present invention provides a process for preparing a curable polyphenylene ether (PPE) resin. The hydroxy (—OH) and ester [—O—(C=O)—R¹³, R¹³ is aryl] groups on the terminal end of PPE is modified by introducing an epoxy group-containing functional group. Thus, a curable PPE resin having an epoxy group on the terminal end can be obtained. Since the modified PPE resin has an epoxy group, it has good comparability to epoxy resin and can be used to fabricate copper-clad laminates with good properties.

According to the present invention, the process for preparing a curable polyphenylene ether is described as follows. A polyphenylene ether resin represented by formula (I) is reacted with a strong base and a compound containing a leaving group and epoxy group. Thus, a curable polyphenylene ether resin represented by formula (II) is obtained.

The main feature of the present invention is that the PPE resin of formula (I) used for modification (i.e., epoxidation) has a high number average molecular weight, i.e., higher than 3000. Preferably, formula (I) has a number average molecular weight of 3100 to 10000, most preferably 3500 to 5000. After modification (epoxidation), the obtained formula (II) (epoxy group-containing PPE) has a high number average molecular weight, i.e., higher than 3000. Preferably, formula (II) has a number average molecular weight of 3100 to 10000, most preferably 3500 to 5000. With such high molecular weight, the obtained epoxy group-containing PPE has a desired high glass transition temperature.

Formula (I) has a number average molecular weight higher than 3000 and is

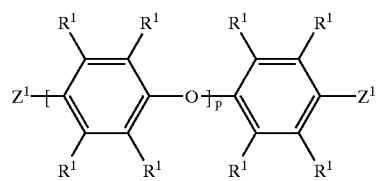

(I)

wherein

R¹ can be the same or different and is H, alkyl having from 1 to 3 carbon atoms, or

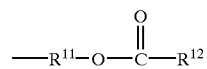

wherein R¹¹ is alkylene having from 1 to 3 carbon atoms, and R¹² is aryl;

Z¹ can be the same or different and is H, OH, or

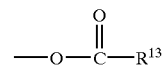

and at least one Z¹ is OH or

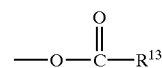

wherein R¹³ is aryl; and p is from 25 to 165.

The compound containing leaving group and epoxy group has the formula (A):

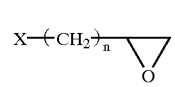

(A)

wherein

X is a leaving group of halogen or sulfonate; and n is an integer of 1 to 6.

Formula (II) is:

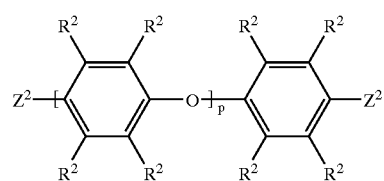

wherein
R² can be the same or different and is H, alkyl having from 1 to 3 carbon atoms,

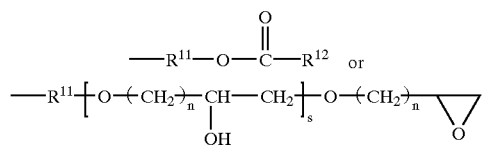

wherein
R¹¹ is alkylene having from 1 to 3 carbon atoms;
R¹² is aryl;
n is an integer of 1 to 6; and
s is 0 or an integer of 1 to 6;
Z² can be the same or different and is H, OH,

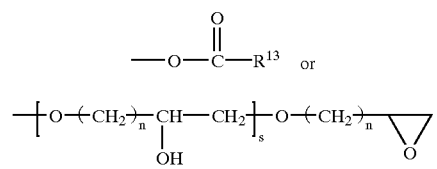

and at least one Z² is a group represented by formula (i), wherein R¹³ is aryl, n and s are defined above; and p is 25 to 165.

In the PPE represented by formula (I), at least one end group Z¹ is hydroxy (—OH) or ester [—O—(C═O)—R¹³, R¹³ is aryl]. After the PPE reacting with the strong base and the compound containing a leaving group and epoxy group, the end group Z¹ is modified into Z². At least one Z² is the group represented by formula (i)

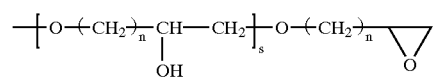

In other words, by means of introducing an epoxy group-containing functional group, the present invention provides a method to modify the thermoplastic PPE resin containing no epoxy group on the end into a curable thermosetting PPE resin containing an epoxy group on the end.

In the modification reaction, the most important step is that an epoxy group-containing functional group is introduced onto the terminal end. In addition, the epoxy group-containing functional group can also be introduced onto the side chain of PPE. For example, when at least one side chain R¹ of PPE of formula (I) is —R¹¹—O—(C═O)—R¹² (R¹¹ is alkylene having from 1 to 3 carbon atoms, R¹² is aryl) (that means, the side chain contains an ester group), after the modification reaction of PPE with the strong base and the compound containing a leaving group and epoxy group, the epoxy group can also be introduced onto the side chain. Thus, R² group becomes

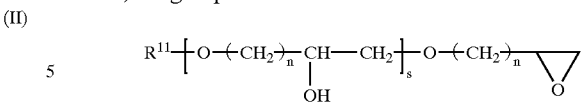

wherein R¹¹ is alkylene having from 1 to 3 carbon atoms; n is an integer of 1 to 6; and s is 0 or an integer of 1 to 6.

The strong base suitable for use in the present invention can be hydroxides of alkali metal, hydrides of alkali metal, or hydrides of alkaline earth metal. Representative examples include lithium hydroxide, sodium hydroxide, potassium hydroxide, sodium hydride, and calcium hydride.

In the compound containing leaving group and epoxy group used in the present invention, the leaving group can be a halogen leaving group or sulfonate leaving group. The halogen can be chlorine, bromine, or iodine. The sulfonate can be tosylate or mesylate. Such a compound containing leaving group and epoxy group can be epibromohydrin, glycidyl tosylate, or epichlorohydrin.

The process for preparing the curable polyphenylene ether resin of the present invention is preferably conducted in the presence of a phase transfer catalyst. Suitable phase transfer catalyst can be $NR^3_4{}^+Y^-$, wherein $R^3$ is alkyl having from 1 to 6 carbon atoms, and $Y^-$ is $Br^-$, $I^-$, $OH^-$ or $HSO_4^-$ (hydrogensulfate). Representative examples include $(n\text{-Bu})_4NHSO_4$, $(n\text{-Bu})_4NOH$, $(n\text{-Bu})_4NBr$, $(n\text{-Bu})_4NI$, tetra-n-propylammonium hydrogensulfate, and tetra-n-propylammonium iodide.

The present invention also provides a curable polyphenylene ether resin that is represented by the formula (II)

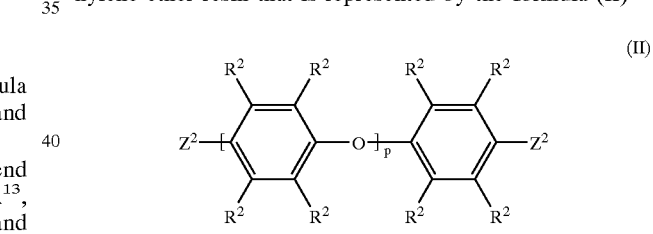

wherein
R² can be the same or different and is H, alkyl having from 1 to 3 carbon atoms,

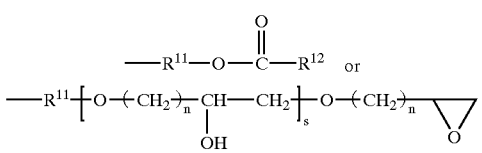

wherein
R¹¹ is alkylene having from 1 to 3 carbon atoms;
R¹² is aryl;
n is an integer of 1 to 6; and
s is 0 or an integer of 1 to 6;
Z² can be the same or different and is H, OH,

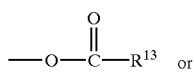

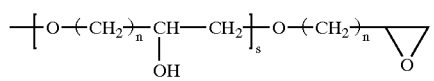

and at least one $Z^2$ is a group represented by formula (i), wherein $R^{13}$ is aryl, n and s are defined above; and p is 25 to 165.

A representative example of $Z^2$ is

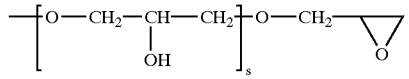

wherein s is 0 or an integer of 1 to 6.

The present invention also provides a polyphenylene ether resin composition, which includes: (a) the epoxy group-containing curable polyphenylene ether resin represented by the formula (II); and (b) 0.1 wt % to 95 wt % of a curing agent for epoxy based on the total weight of the composition.

The curing agent for epoxy of the present invention is not limited and can be any curing agent frequently used for epoxy resin, such as amine curing agents, phenolic curing agents, and anhydride curing agents. The amine curing agent can be added in an amount such that the equivalent weight ratio of the active hydrogen of the amine to the epoxy group is 0.5 to 3.0. Representative examples of the amine curing agents include dicyandiamide, diethylene triamine, $BF_3$-MEA, melamine, guanamine, and biguanide. The phenolic curing agent can be added in an amount such that the equivalent weight ratio of the hydroxy group to the epoxy group is 0.5 to 2.0, preferably 0.6 to 1.3. Representative examples of the phenolic curing agents include phenolic novolac, cresol novolac, resorcinol novolac, bisphenol A phenolic novolac, and tris(dimethyl aminomethyl)phenol. The anhydride curing agent can be added in an amount such that the equivalent weight ratio of the anhydride group to the epoxy group is 0.5 to 3.0. A representative example of the anhydride curing agent is phthalic anhydride.

The polyphenylene ether resin composition of the present invention can further include 0.5 to 90 wt % of an epoxy resin based on the total weight of the composition. Suitable epoxy resin can be dicyclopentadienyl epoxy resin, biphenyl epoxy resin, phenolic novolac epoxy resin, bisphenol epoxy resin, terpene epoxy resin, aralkyl epoxy resin, multi-functional epoxy resin, naphthalene series epoxy resin, halogenated epoxy resin, or mixtures thereof.

The polyphenylene ether resin of the present invention can further include 0.1 wt % to 10 wt %, preferably 0.5 wt % to 10 wt %, of a curing accelerator for epoxy, based on the total weight of the composition. The curing accelerator is not limited and can be any frequently used for epoxy resin. Representative examples include triphenyl phosphine, tri(2,6-dimethoxyphenyl) phosphine, tri(p-tolyl) phosphine, triphenyl sulfite, 2-methylimidazole, 2-phenylimidazole, 2-undecylimidazole, 2-heptadecylimidazole, 2-ethyl-4-methylimidazole, 2-dimethylaminocresol, benzyldimethylamine, 2,5-azobicyclo[4,3,0]-5-nonene, 1,4-azobicyclo[2,2,2]octane, or 1,8-azobicyclo[5,4,0]-7-undecene.

The polyphenylene ether resin composition of the present invention can also include 0.1 wt % to 50 wt % of a flame retardant, based on the total weight of the composition. The flame retardant can be phosphorus-containing flame retardants, chlorine-containing flame retardants, bromine-containing flame retardants, nitrogen-containing flame retardants, oxides of antimony, aluminum hydroxide, magnesium hydroxide, or mixtures thereof.

The polyphenylene ether resin composition of the present invention can be applied in resin coated coppers, adhesives, IC package materials, or powder coatings.

According to the present invention, the above components of the resin composition are dissolved in a solvent and mixed thoroughly to form a varnish. Then, a reinforcing material, such as paper or glass cloth, is impregnated with the varnish and dried, thus forming a pre-preg.

The above pre-preg is bonded to a copper foil by compression molding to form a copper-clad laminate. Such a copper-clad laminate has superior electrical properties and can meet the requirements for high speed and high frequency communication devices. Thus, it is suitable for use in fabricating printed circuit boards.

The following examples are intended to illustrate the process and the advantages of the present invention more fully without limiting its scope, since numerous modifications and variations will be apparent to those skilled in the art.

EXAMPLE 1

Redistribution of PPE 360 g of poly(2,6-dimethyl-1,4-phenylene ether) (a PPE having a number average molecular weight of 19772 g/mole was dissolved in 360 g of toluene at 100° C. After complete dissolution, 36 g of bisphenol A (BPA) was added and 48 g of benzoylperoxide (BPO, 75% in water) was added slowly. The reaction was conducted for 2 hours at 100° C. The mixture was allowed to cool to room temperature and 800 ml of methanol was added for precipitation. Then, the precipitated solid was washed with methanol at least two times. The product obtained was dried to give a redistributed PPE (rPPE) (360 g). The rPPE product has a number average molecular weight of about 3500 g/mole determined by gel permeation chromatography (GPC).

EXAMPLE 2

Modification of the Terminal End of rPPE 50 g of rPPE product obtained from Example 1 was dissolved in 150 ml of toluene and heated to 65° C. 6.73 g of KOH was dissolved in 20.2 g of methanol. Then, the methanol solution of KOH was poured into the toluene solution of rPPE. The reaction was conducted at 65° C. for 4 hours. The reaction mixture was allowed to cool to 35° C. 6.94 g of epichlorohydrin was added, and the reaction was conducted at room temperature for 14 hours.

The reaction mixture was then concentrated under reduced pressure to a residual amount of 50 ml, which was then poured into 200 ml of methanol to precipitate the resin. The resin obtained was washed with methanol two times, dried under vacuum to give a rPPE product having epoxy group on the terminal end.

Figure 1A:
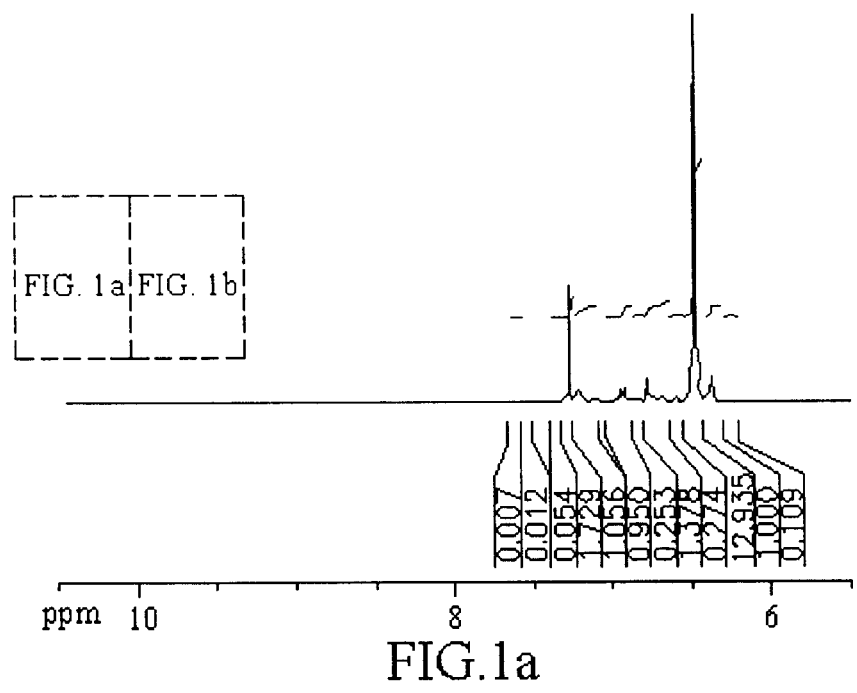
Figure 1B:
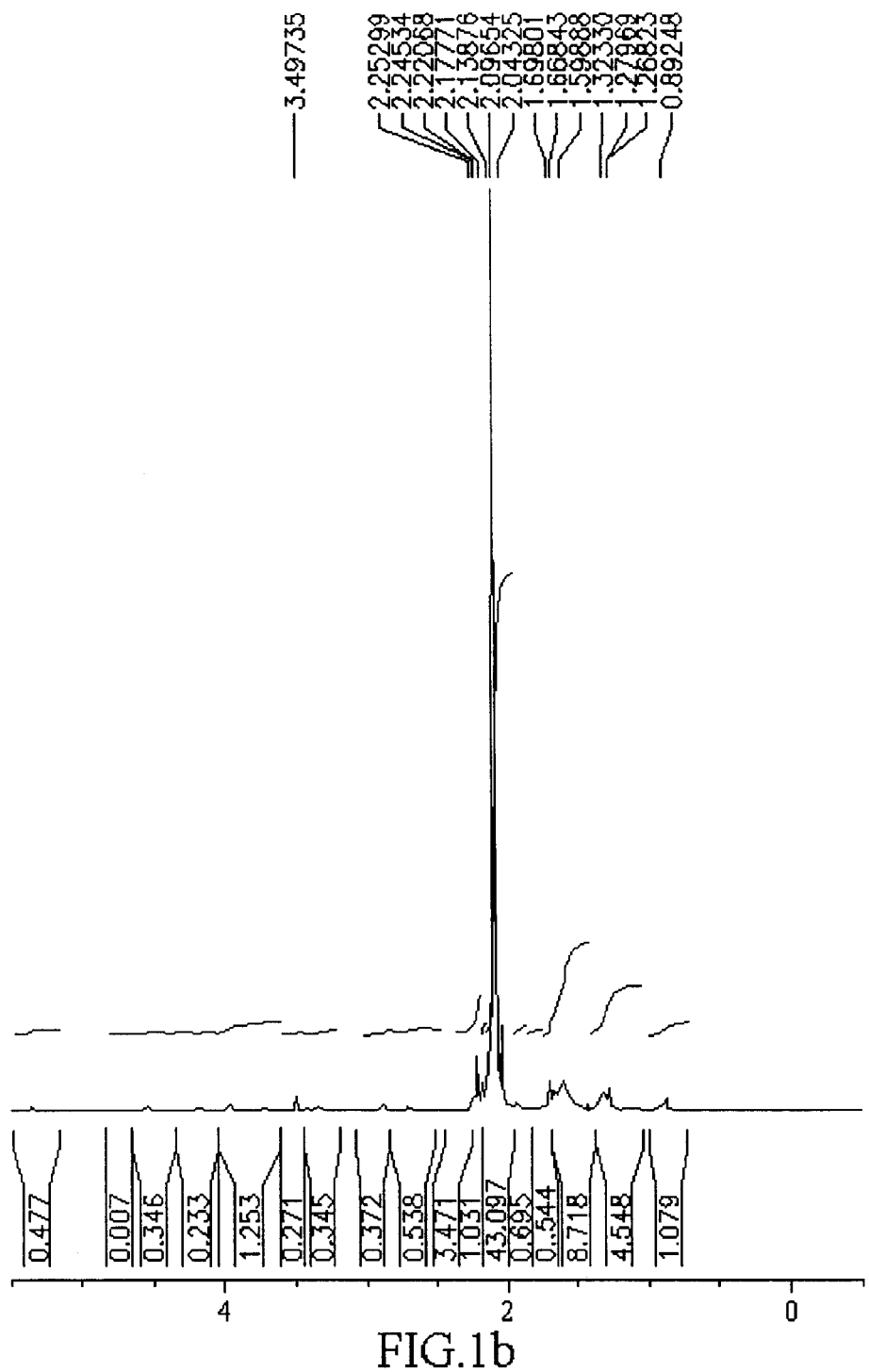

From the NMR spectrum (FIG. 1), it can be seen that the epoxy group has been successfully introduced ($\delta$=2.88 ppm, 2.77 ppm).

EXAMPLE 3

Figure 2:
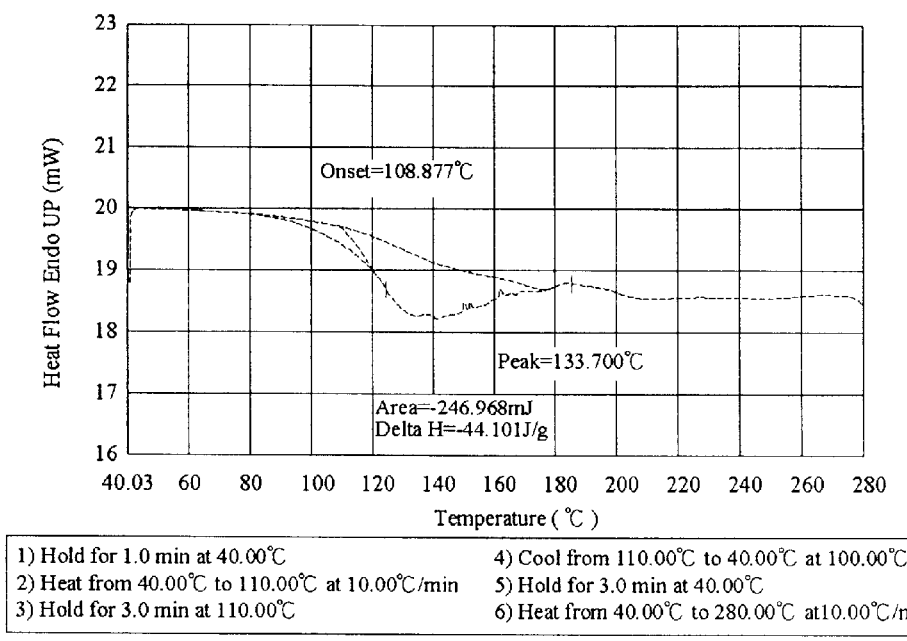
FIG. 2 shows the DSC diagram of the resin composition prepared from Example 3 of the present invention.

Preparing Curable PPE Resin Composition and Varnish 8.9 g of the rPPE with terminal epoxy group prepared from Example 2 was dissolved in 17.8 g of toluene. After complete dissolution, 11.13 g of tetrabromoepoxy resin (contains 20% of acetone) under the trademark of BEB-530A80 available from Chang Chun Plastics Co. Ltd. was added and stirred to complete dissolution, obtaining solution A. In addition, 1.06 g of DICY (dicyandiamide) (a curing agent), 0.2 g of 2-MI (2-methylimidazole) (a curing accelerator), and 5.3 g of DMF (N,N-dimethylformamide) were stirred to obtain solution B. Finally, solution B was added to solution A and stirred to form a varnish. From the DSC curve (FIG. 2), it can be seen that there is an exothermic peak. This proves that there is crosslinking reaction between the end group-modified rPPE and the epoxy resin.

EXAMPLE 4

Preparing Pre-Preg

Glass cloth (8 cm×8 cm) was impregnated in the varnish prepared from Example 3 and then removed to dry at 120° C. for 5 minutes. A pre-preg was obtained.

EXAMPLE 5

Preparing Laminate

Based on needed thickness, a predetermined number of pre-preg sheets prepared in Example 4 were stacked. The pre-preg stack was then subjected to press molding in a vacuum press molding machine at 200° C. for 1 hour, obtaining a laminate. The electrical properties of the laminate are: Dk(1 MHz)=3.8, Df(1 MHz)=0.014, Glass Transition Temperature (Tg) (DSC)=167° C.

Comparative Example 1

Redistribution of PPE to Obtain rPPE with Small Molecular Weight 360 g of poly(2,6-dimethyl-1,4-phenylene ether) (a PPE having a number average molecular weight of 19772 g/mole was dissolved in 360 g of toluene at 100° C. After complete dissolution, 72 g of bisphenol A (BPA) was added and 96 g of benzoylperoxide (BPO, 75% in water) was added slowly. The reaction was conducted for 2 hours at 100° C. The mixture was allowed to cool to room temperature and 800 ml of methanol was added for precipitation. Then, the precipitated solid was washed with methanol at least two times. The product obtained was dried to give a redistributed PPE (rPPE) (360 g). The rPPE product has a number average molecular weight of about 2500 g/mole determined by gel permeation chromatography (GPC).

Comparative Example 2

Preparing Laminate Using Small-Molecular-Weight rPPE

The same procedures described in Examples 2 to 5 were repeated to prepare a laminate, except that the small-molecular-weight rPPE obtained from Comparative Example 1 was used. The electrical properties of the laminate using small-molecular-weight rPPE are: Dk(1 MHz)= 3.9, Df(1 MHz)=0.015, Glass Transition Temperature(Tg) (DSC)=138° C.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for preparing an epoxy group-containing curable polyphenylene ether (PPE) resin, comprising:

reacting a polyphenylene ether resin represented by formula (I), a strong base, and a compound containing a leaving group and epoxy group to obtain a curable polyphenylene ether resin represented by formula (II), wherein formula (I) has a number average molecular weight higher than 3000 and is

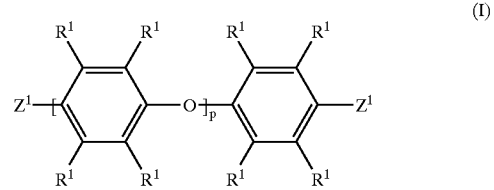

wherein $R^1$ can be the same or different and is H, alkyl having from 1 to 3 carbon atoms, or

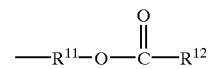

wherein $R^{11}$ is alkylene having from 1 to 3 carbon atoms, and $R^{12}$ is aryl;

$Z^1$ can be the same or different and is H, OH, or

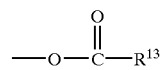

and at least one $Z^1$ is OH or

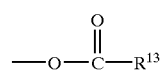

wherein $R^{13}$ is aryl; and p is from 25 to 165, wherein the compound containing leaving group and epoxy group has the formula (A):

wherein

X is a leaving group of halogen or sulfonate; and n is an integer of 1 to 6, wherein the formula (II) is:

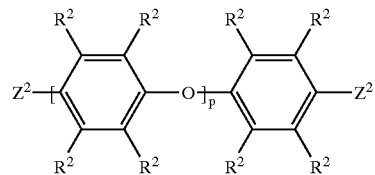
(II)

wherein $R^2$ can be the same or different and is H, alkyl having from 1 to 3 carbon atoms,

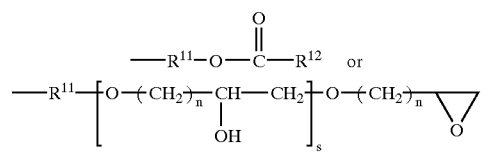

wherein $R^{11}$ is alkylene having from 1 to 3 carbon atoms;
$R^{12}$ is aryl;
n is an integer of 1 to 6; and
s is 0 or an integer of 1 to 6;

$Z^2$ can be the same or different and is H, OH,

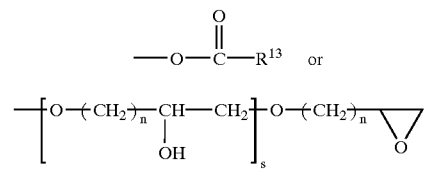
(i)

and at least one $Z^2$ is a group represented by formula (i), wherein $R^{13}$ is aryl, n and s are defined above; and p is 25 to 165.

2. The process as claimed in claim 1, wherein the strong base is hydroxides of alkali metal, hydrides of alkali metal, or hydrides of alkaline earth metal.

3. The process as claimed in claim 2, wherein the strong base is lithium hydroxide, sodium hydroxide, potassium hydroxide, sodium hydride, or calcium hydride.

4. The process as claimed in claim 1, wherein the leaving group in the compound containing leaving group and epoxy group is halogen or sulfonate.

5. The process as claimed in claim 1, wherein the halogen is chlorine, bromine, or iodine.

6. The process as claimed in claim 1, wherein the sulfonate is tosylate or mesylate.

7. The process as claimed in claim 4, wherein the compound containing leaving group and epoxy group is epibromohydrin, glycidyl tosylate, or epichlorohydrin.

8. The process as claimed in claim 1, wherein the process is conducted in the presence of a phase transfer catalyst.

9. The process as claimed in claim 8, wherein the phase transfer catalyst is $NR^3_4{}^+Y^-$, wherein $R^3$ is alkyl having from 1 to 6 carbon atoms, $Y^-$ is $Br^-$, $I^-$, $OH^-$ or $HSO_4^-$ (hydrogen sulfate).

10. The process as claimed in claim 9, wherein the phase transfer catalyst is $(n-Bu)_4NHSO_4$, $(n-Bu)_4NOH$, $(n-Bu)_4NBr$, $(n-Bu)_4NI$, tetra-n-propylammonium hydrogensulfate, or tetra-n-propylammonium iodide.

11. The process as claimed in claim 1, wherein formula (I) has a number average molecular weight of 3100 to 10000.

12. The process as claimed in claim 11, wherein formula (I) has a number average molecular weight of 3500 to 5000.

13. The process as claimed in claim 1, wherein formula (II) has a number average molecular weight of 3100 to 10000.

14. The process as claimed in claim 13, wherein formula (II) has a number average molecular weight of 3500 to 5000.

* * * * *